United States Patent [19]
Moriyama

[11] Patent Number: 5,746,860
[45] Date of Patent: May 5, 1998

[54] METHOD OF BUILDING GREEN TIRES FOR LOW-SECTION PROFILE PNEUMATIC RADIAL TIRES

[75] Inventor: Sadao Moriyama, Musashimurayama, Japan

[73] Assignee: Bridgestone Corporation, Tokyo, Japan

[21] Appl. No.: 767,856

[22] Filed: Dec. 17, 1996

Related U.S. Application Data

[63] Continuation of Ser. No. 420,474, Apr. 12, 1995, abandoned.

[30] Foreign Application Priority Data

| Apr. 12, 1994 | [JP] | Japan | 6-073082 |
| Apr. 12, 1994 | [JP] | Japan | 6-073083 |
| Mar. 10, 1995 | [JP] | Japan | 7-051001 |

[51] Int. Cl.⁶ .......................... B29D 30/30; B29D 30/72
[52] U.S. Cl. ................ 156/111; 156/128.1; 156/130.7; 156/133
[58] Field of Search .................... 156/111, 123, 156/126, 127, 128.1, 130.7, 130.3, 129, 130, 405.1, 133; 152/523–525, 209 R

[56] References Cited

U.S. PATENT DOCUMENTS

| 1,220,178 | 3/1917 | Brucker | 156/421 |
| 1,661,449 | 3/1928 | Tew | 156/130 |
| 3,937,862 | 2/1976 | Dillenschneider | 152/525 |
| 4,007,069 | 2/1977 | Takayanagi et al. | 156/123 |

FOREIGN PATENT DOCUMENTS

| 4 191 42 | 3/1991 | European Pat. Off. |
| 2 121 066 | 8/1972 | France |
| 2 548 081 | 1/1985 | France |
| 2 624 442 | 6/1989 | France |
| 4918790 | 5/1974 | Japan |
| 60-132745 | 7/1985 | Japan |
| 1111502 | 4/1989 | Japan |
| 1111503 | 4/1989 | Japan |

OTHER PUBLICATIONS

Patent Abstracts of Japan, vol. 13, No. 334 (M–855), Jul. 27, 1989 (JP-A–01 111 502).
European Search Report, Jan. 25, 1996.

*Primary Examiner*—Geoffrey L. Knable
*Attorney, Agent, or Firm*—Sughrue, Mion, Zinn, Macpeak & Seas, PLLC

[57] ABSTRACT

A low-section profile pneumatic radial tire comprising a radial carcass, a belt, a tread rubber and a pair of sidewall rubbers and having an aspect ratio of not more than 55% is manufactured by using a green tire built through first and second building steps, in which an uncured inner sidewall rubber segment and an uncured outer sidewall rubber segment are previously and separately provided so as to correspond to an inner portion and an outer portion parted from each sidewall rubber of a tire after vulcanization in a radial direction thereof satisfying that an end of a parting face located on an outer surface of the sidewall rubber is not more than ½ of a section height of the tire and the uncured inner sidewall rubber segment is stuck at the first building step and the uncured outer sidewall rubber segment is stuck at the second building step.

4 Claims, 7 Drawing Sheets

FIG_5
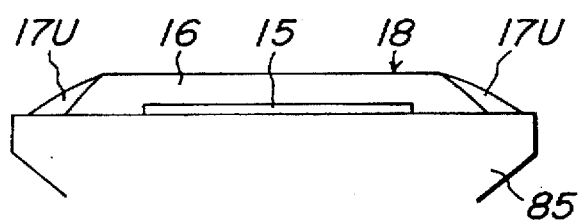
FIG_6
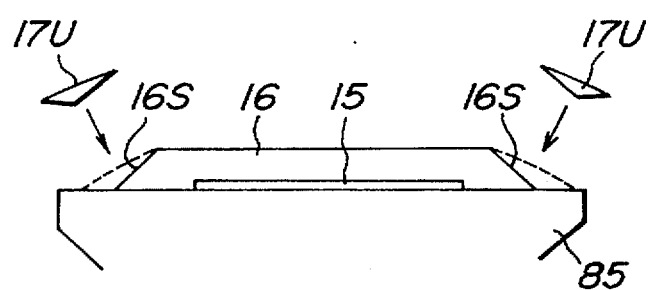

FIG_7
PRIOR ART
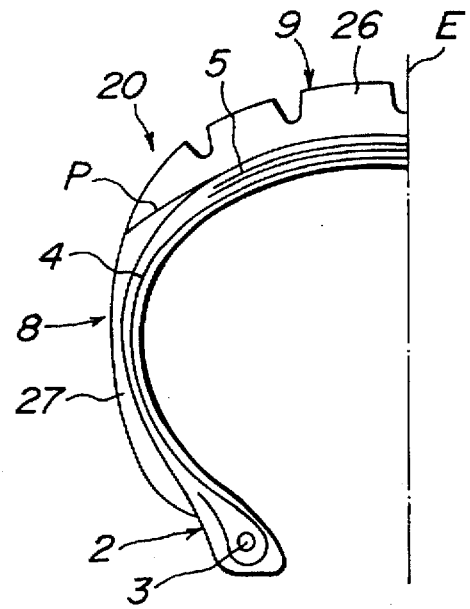
FIG_8
PRIOR ART
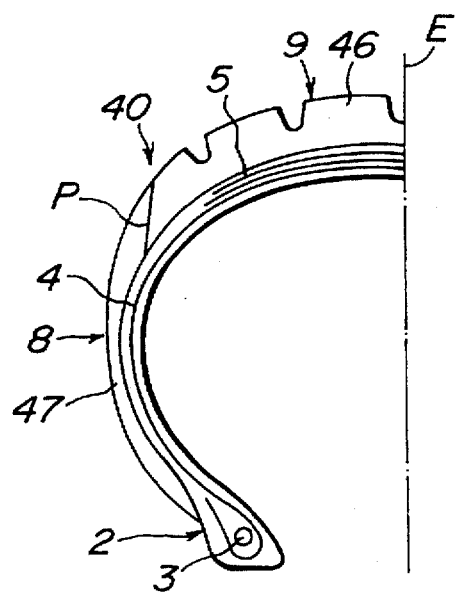

5,746,860

METHOD OF BUILDING GREEN TIRES FOR LOW-SECTION PROFILE PNEUMATIC RADIAL TIRES

This is a Continuation of application Ser. No. 08/420,474 filed Apr. 12, 1995 now abandoned.

BACKGROUND OF THE INVENTION

1. Field of the Invention

This invention relates to a method of building a green tire for a low-section profile pneumatic radial tire having an aspect ratio of not more than 55%. More particularly it relates to a method of building a green tire for a low-section profile pneumatic radial tire capable of advantageously solving a problem of durability considerably created in a sidewall rubber inherent to this type of the tire to largely develop excellent durability while maintaining productivity at the building step of the green tire at a high level.

2. Description of the Related Art

At first, an outline of the pneumatic radial tire is described with reference to a tire 20 shown in FIG. 7. In FIG. 7 is schematically shown a left-side half section of a main construction of the tire 20 with respect to an equatorial plane E thereof. The tire 20 comprises a radial carcass 4 of at least one rubberized ply (one ply in the illustrated embodiment) toroidally extending between bead cores 3 embedded in a pair of bead portions 2, a belt 5 superimposed about a crown portion of the carcass 4, a tread rubber 26 arranged on the belt 5 and a pair of sidewall rubbers 27 each extending from each side end of the tread rubber 26 to an upper position of each of the bead portions 2 outside the carcass 4.

Moreover, the carcass 4 is comprised of at least one rubberized cord ply containing cords arranged at a cord angle of about 90° with respect to the equatorial plane E and reinforces the bead portion 2, a sidewall portion 8 comprised of the sidewall rubber 27 and a tread portion 9 comprised of the tread rubber 26. The belt 5 is comprised of two or more belt layers, cords of which layers being crossed with each other, and reinforcing the tread portion 9.

Other pneumatic radial tires 40 and 60 shown in FIGS. 8 and 9 have the same construction as the tire 20 shown in FIG. 7, respectively, except that a joint face P between a tread rubber 46 or 66 and a sidewall rubber 47 or 67 (shown by a joining line) in the tire 40 or 60 is different from that of the tire 20. As regards the joint face P, the tire 20 of FIG. 7 that an upper end portion of the sidewall rubber 27 is located at an inner side surface of an end portion of the tread rubber 26 in the widthwise direction thereof, while the tire 40 of FIG. 8 illustrates that the upper end portion of the sidewall rubber 47 is located at an outer side surface of an end portion of the tread rubber 46 in the widthwise direction thereof. The tire 60 of FIG. 9 has a so-called eclectic arrangement between the embodiments of FIGS. 7 and 8 that the tread rubber 66 is interposed between an upper end portion of the sidewall rubber 67 and a rubber 67-1 having the same compounding composition as the sidewall rubber 67 in form of a wedge. In the embodiment of FIG. 9, the sidewall rubber 67 has two joint faces P and $P_1$ to the upper sidewall rubber 67-1 and the tread rubber 66.

Irrespective of the form of the joint face, the tread rubbers 26, 46 and 66 are portions generating traction force and braking force by directly contacting with a road surface during the running of the radial tire under loading and subjected to a cornering force in the cornering. Thus they are required to be made from a material having an excellent wear resistance as a basic property. On the other hand, the sidewall rubbers 27, 47 and 67 arranged in the sidewall portion 8 repeatedly subjected to flexing deformation (which is called as a flex zone) are required to be made from a material having an excellent resistance to bending fatigue as a basic property. However, these properties have a conflicting relationship in rubber compounding technique, so that it is common to apply different rubber compositions having a compounding recipe so as to sufficiently develop properties required in the tread rubber and sidewall rubber of the pneumatic radial tire.

The building of three type green tires just before the vulcanization for the manufacture of the pneumatic radial tires 20, 40 and 60 will be described with reference to FIGS. 10–12 corresponding to these tires. FIGS. 10–12 are diagrammatic views illustrating a section of a green tire just before finishing and a partial section of a portion of a building machine at a second building step as mentioned below.

The building common to the green tires of three types is a two stage building method consisting of a first building step, in which a given number of uncured radial carcass ply members 14 are supplied onto a cylindrical drum (not shown) and a pair of uncured bead core members 13 are fixed onto an outer uncured carcass ply member 14 and then the carcass ply member 14 is wound around each of the uncured bead core members 13 to form a cylindrical green case. In and a second building step, the green case is expanded while narrowing the distance between the mutual uncured bead core members 13 and then an uncured belt member 15 and an uncured tread rubber member 36, 56 or 76 are stuck onto the outer periphery of the expanded green case. Moreover, the sticking between the uncured members used herein means a closely uniting of one of the uncured members onto the other uncured member through a tackiness inherent to each uncured member.

The first type of the building is a building method for the manufacture of the tire 20 shown in FIG. 7. In this case, a green case 31G stuck with the uncured rubber member 37 corresponding to the sidewall rubber 27 in FIG. 7 at the first building step is supplied to the subsequent second building step, where the green case 31G is expanded and deformed as shown in FIG. 10 and the uncured belt member 15 and the uncured tread rubber member 36 are stuck onto the outer periphery of the expanded green case 31G. In this case, the uncured tread rubber member 36 has a total width set to sufficiently cover an upper end portion of the uncured sidewall rubber member 37. Thereafter, both sides of the uncured tread rubber member 36 are folded downward by means of stitching rolls (not shown) in a direction of an arrow B and pressed and stuck onto the uncured sidewall rubber member 37 and occasionally onto the uncured carcass ply member 14 to obtain a green tire. This building method is called a side presticking system because the uncured sidewall rubber member 37 as a whole is previously stuck onto the green case 31G at the first building step.

The second type of the building is a building method for the manufacture of the tire 40 shown in FIG. 8. In this building method, the uncured rubber member 57 corresponding to the sidewall rubber 47 of FIG. 8 is stuck onto a green case 51G at the first building step, which is similar to the side presticking system but is largely different in a point that a region of sticking the uncured rubber member 57 onto the green case 51G is restricted to a region 12 corresponding to the bead portion 8 shown in FIG. 8 and a synthetic resin sheet 80 such as polyethylene sheet or the like shown by dotted lines is interposed at the remaining region other than the region 12 between an inner surface of the uncured sidewall rubber member 47 and the green case 51G to prevent tacky uniting therebetween as shown in FIG. 11.

As shown in FIG. 11, the green tire 51G after the first building step is expanded and deformed and a pair of the uncured sidewall rubber members 57 fall outward at the second building step, while the uncured belt member 15 and the uncured tread rubber member 56 are stuck onto the outer periphery of the green case 51G and then both sides of the uncured tread rubber member 56 are folded in a direction of an arrow C and stuck onto the uncured carcass ply member 14 by means of stitching rolls. After the polyethylene sheet 80 is removed, each of the uncured sidewall rubber members 57 is raised and stuck onto the green case 51G and each side of the uncured tread rubber member 56 to obtain a green tire. This building method is called a side post-sticking system, which is different from the side presticking system.

The third type of building is a method for the manufacture of the tire 60 shown in FIG. 9 as described in JP-B-49-18790. The first building step of this method is said to be a modified embodiment for improving inconvenience of the side presticking system. This modification lies in a point that in addition to the uncured sidewall rubber member 77 stuck onto the green case 71G, a pair of uncured rubber strips 77-1 each having the same compounding rubber composition as the rubber member 77 are previously stuck onto both side surfaces of the uncured tread rubber member 76 to form a composite uncured rubber member 78 to be applied to the second building step as shown in FIG. 12. The second building is carried out in the same manner as in the first type building to obtain a green tire.

When the tire 20 is vulcanized from the green tire built by the side presticking system of the first type building, the productivity at the vulcanization building step is excellent, but the following disadvantage is caused.

That is, it is unavoidable to reveal an outer end of the joint face P between the tread rubber 26 and the sidewall rubber 27 on a surface of the flex zone. Furthermore, a rubber composition having a relatively high hardness (Shore A hardness or JIS hardness) as an indispensable property largely developing wear resistance, e,g, a Shore A hardness of 55°–75° is applied to the tread rubber 26, while a rubber composition having a relatively low hardness necessarily developing an excellent resistance to bending fatigue, e.g. a Shore A hardness of 40°–60° is applied to the sidewall rubber 27, provided that the hardness of the tread rubber is made higher than that of the sidewall rubber. As a result, rubbers having a large difference in hardness are disposed on both sides bordering the joint face P, so that cracks are created from a position of the joint face P existing on the surface of the flex zone at an early stage shortly after the start of the running and gradually progress to the inside of the tire along the joint face P to cause separation failure as the running distance becomes long, and finally durability is degraded.

When the tire 40 is vulcanized from the green tire built by the side post-sticking system of the second type building, the point of the joint face P revealed on the tire surface is out of the flex zone upward (outward in the radial direction), so that the occurrence of cracking failure can be avoided. However, it is required to conduct the application and removal operations of the polyethylene sheet and two sticking operations of the uncured sidewall rubber member 57 in the building of the green tire, so that productivity is considerably obstructed because the extra manhour is added.

The tire 60 obtained by the third type building method possesses advantageous points of the tires 20 and 40 and can eliminate the disadvantageous points thereof, so that the third type building is superior to the first and second type of building processes. Because, the position of the joint face $P_1$ between the upper sidewall rubber strip 67-1 and the tread rubber 60 the tire surface is the same as in the tire 40, so that the fear of causing the above cracking failure can be avoided, and also high productivity can be ensured without requiring the addition of extra manhours. Therefore, the third type building is widely practiced as a method of building the green tire for the pneumatic radial tire.

Recently, the flatness in the low-section profile tire developing excellent durability and steering stability in high-speed running has increased In this case, the degree of the flatness is represented by an aspect ratio (SH/SW) of section height SH to section width SW in the tire as a percentage. That is, it tends to generalize low-section profile pneumatic radial tires having an aspect ratio of not more than 55%. In this tendency, there is found out the cracking failure of new type which has never been observed in the conventional pneumatic radial tires.

That is, it has been found out that such a new cracking failure is first caused at a position of the joint face P between the sidewall rubber 67 and the upper sidewall rubber strip 67-1 revealed on the tire surface as shown in FIG. 9 and progresses to the inside of the tire along the joint face P as the running distance becomes long. Also, this failure is found to be inherent to the low-section profile tire as the value of the aspect ratio becomes small. In the conventional pneumatic radial tire, there is caused no occurrence of such a new type failure at the joint face between the rubbers having the same compounding recipe in the sidewall portion 8.

SUMMARY OF THE INVENTION

It is, therefore, an object of the invention to provide a method of building a green tire for low-section profile pneumatic radial tires, particularly tires having an aspect ratio of not more than 55% capable of developing an excellent resistance to cracking in a sidewall portion without degrading other tire performances while maintaining the productivity of the green tire at a higher level.

The inventors have noticed that cracks are apt to be caused at a position of a joint face between rubbers having the same compounding recipe in the sidewall portion as the value of the aspect ratio becomes smaller. They have made various studies with respect to causes in practice and found that the condition of strain at the surface of the sidewall portion is strongly interrelated to the value of the aspect ratio, and as a result the invention has been accomplished.

According to the invention, there is the provision of a method of building a green tire for a low-section profile pneumatic radial tire comprising a radial carcass of at least one rubberized ply toroidally extending between bead cores embedded in a pair of bead portions, a belt superimposed about a crown portion of the carcass, a tread rubber arranged on the belt and a pair of sidewall rubbers each extending from each side end of the tread rubber to an upper position of each of the bead portions and having an aspect ratio of not more than 55%, which comprises:

previously and separately providing an uncured inner sidewall rubber segment and an uncured outer sidewall rubber segment, which segments correspond to an inner portion and an outer portion parted from each sidewall rubber of a tire after vulcanization in a radial direction thereof so as to satisfy that an end of a parting face located on an outer surface of the sidewall rubber is not more than ½ of a section height of the tire;

sticking the uncured inner sidewall rubber segment on a cylindrical green case assembled with an uncured carcass ply member and an uncured bead core member at a first building step;

toroidally expanding and deforming the green case by narrowing a distance between the uncured bead core members;

sticking an uncured belt member and an uncured tread rubber member on an outer periphery off the toroidally deformed green case at a second building step, in which the uncured outer sidewall rubber segment integrally united to each side face of the uncured tread rubber member is stuck on the uncured inner sidewall rubber segment of the green case to form a unified sidewall rubber member.

In a preferable embodiment of the invention, the end of the parting face is located in the vicinity of an outer end in radial direction of an annular projecting rib provided on an outer surface of a sidewall rubber of a vulcanized tire at a position of a height corresponding to not more than ½ of the section height of the tire.

In another preferable embodiment of the invention, a pair of the uncured outer sidewall rubber segments are extruded together with the uncured tread rubber member through an extruder having a plurality of extruding heads in form of a composite rubber member to be applied to the second building step.

In the other preferable embodiment of the invention, the uncured belt member and the uncured tread rubber member are stuck on a forming drum having a given outer diameter, and a pair of uncured outer sidewall rubber segments are stuck on both side surfaces of the uncured tread rubber member to form a combination member, which are applied to the second building step.

BRIEF DESCRIPTION OF THE DRAWINGS

The invention will be described with reference to the accompanying drawings, wherein:

FIG. 5 is a schematic view illustrating a first embodiment of the combination member to be supplied to the second building step in the building method according to the invention;

FIG. 6 is a schematic view illustrating a second embodiment of a combination member to be supplied to the second building step in the building method according to the invention;

FIG. 7 is a diagrammatically left-half sectional view illustrating a joint face between a sidewall rubber and a tread rubber in a tire built by the conventional first type building method;

FIG. 8 is a diagrammatically left-half sectional view illustrating a joint face between a sidewall rubber and a tread rubber in a tire built by the conventional second type building method;

DESCRIPTION OF THE PREFERRED EMBODIMENTS

Figure 13:
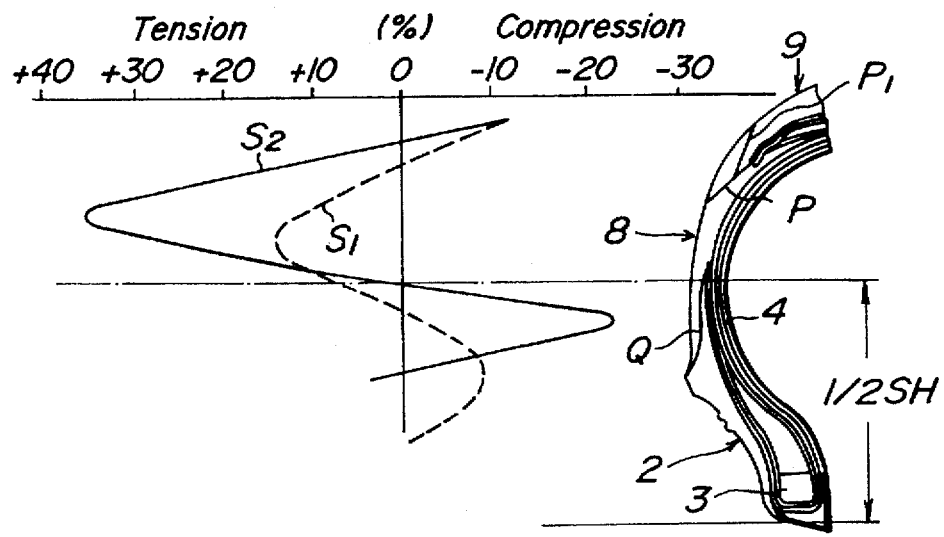
FIGS. 13 and 14 are diagrams showing strain generated at a surface of a sidewall portion in a tire under loading as measured under different test conditions, respectively.
Figure 14:
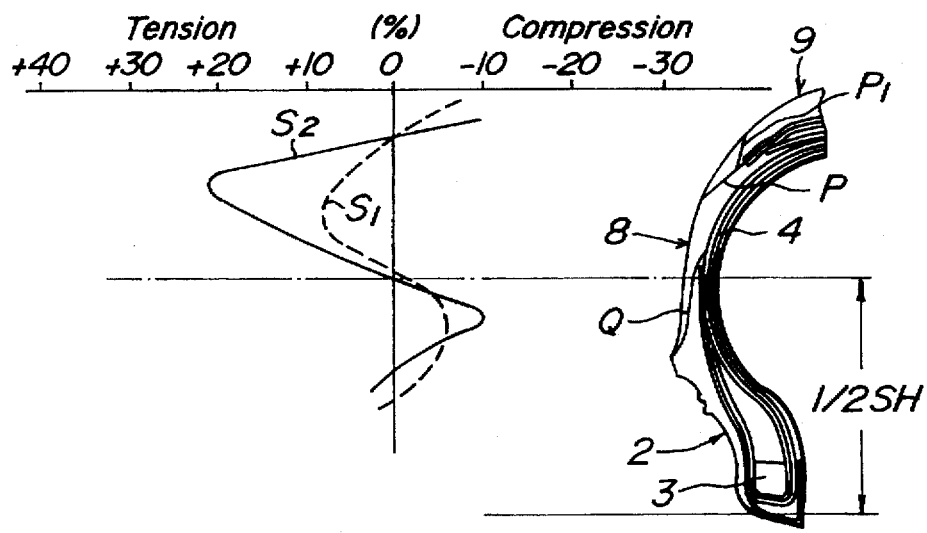

First a distribution curve of strain generated on a surface of a sidewall portion 8 of a tire in a radial direction thereof under loading is described with reference to FIGS. 13 and 14. In FIGS. 13 and 14, a right-hand side shows a left-half section of a tire mainly composed of a sidewall portion 8 and a bead portion 2, while a left-hand side shows a strain (%) divided into tension (+ symbol) and compression (− symbol). As a tire tested for the measurement of strain, there are two kinds of a pneumatic radial tire for passenger car having tire sizes of 206/65R15 (aspect ratio: 65%) and 225/45ZR17 (aspect ratio: 45%). For convenience' sake, these two tires are shown by the same sectional shape in the evaluation of the strain distribution.

As the test conditions for the measurement of strain, there are a CBU drum condition in which the tire is pushed onto a drum under a low internal pressure and a high load to cause cord breaking-up (CBU) in the carcass 4, and an actual running condition in which the tire is actually run under normal internal pressure and load. The test results under the CBU condition are shown in FIG. 13, while the test results under the actual running condition are shown in FIG. 14. Moreover, the CBU condition is a condition capable of observation in practical use and advantageously comparing subsequent evaluations in a short time.

In FIGS. 13 and 14, a curve of dotted lines $S_1$ is a strain distribution curve at an aspect ratio of 65% and a curve of solid line $S_2$ is a strain distribution curve at an aspect ratio of 45%. These curves are the same in the right-half section of the tire (not shown). When the strain distributions are compared between the two tires, it has newly been found that a peak value of the tension strain exerting upon the occurrence of cracking and its growth is considerably higher in the aspect ratio of 45% than in the aspect ratio of 65% under any test conditions. Also a position of section height corresponding to the peak value of tension strain at the aspect ratio of 45% is shifted more upward as compared with that at the aspect ratio of 65%.

Particularly, it has been found that the tendency of considerably increasing the peak value of tension strain and the tendency of shifting the position of the peak value upward (in the radial direction of the tire) are unavoidable facts remarkably appearing as the value of aspect ratio becomes small.

Figure 9:
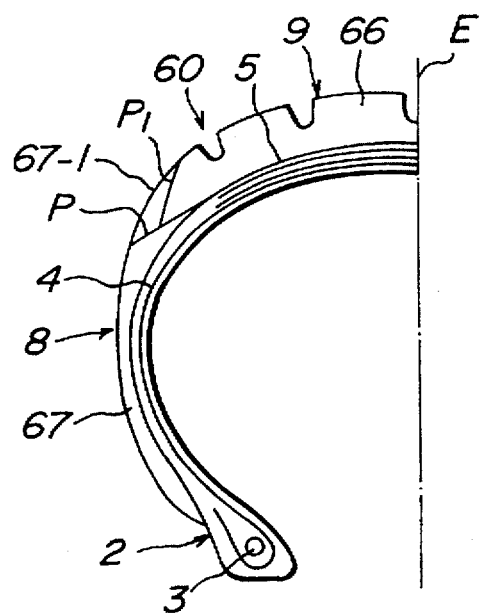
FIG. 9 is a diagrammatically left-half sectional view illustrating a joint face between mutual sidewall rubbers in a tire built by the conventional third type building method.
Figure 10:
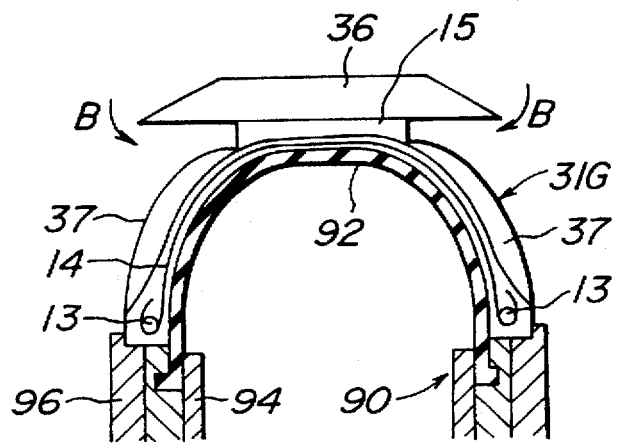
FIG. 10 is a schematic view illustrating a section of a green tire at the first half of a second building step for building the tire of FIG. 7.
Figure 11:
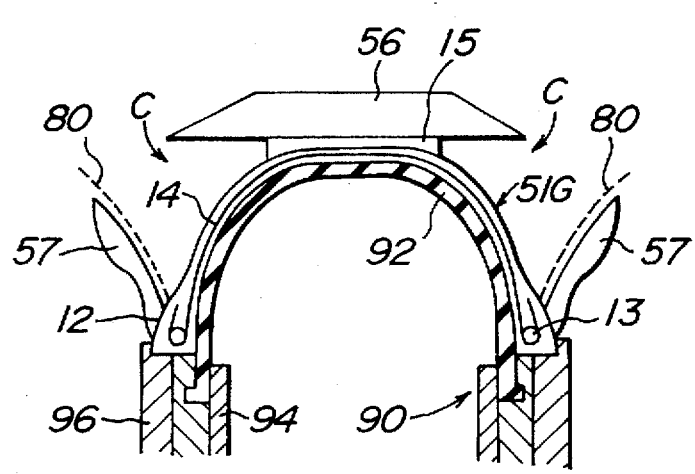
FIG. 11 is a schematic view illustrating a section of a green tire at the first half of a second building step for building the tire of FIG. 8.
Figure 12:
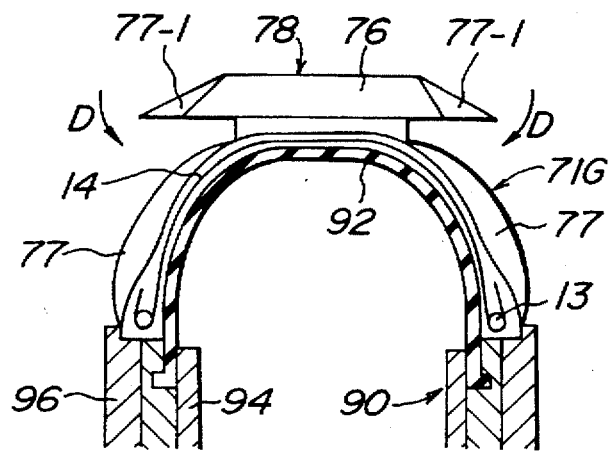
FIG. 12 is a schematic view illustrating a section of a green tire at the first half of a second building step for building the tire of FIG. 9.

As shown in FIGS. 13 and 14, the tension strain of the end of the joint face P between the sidewall rubbers 67 and 67-1 (see FIG. 9) revealing on the tire surface is a relatively small value on the curve $S_1$ in the tire having an aspect ratio of 65%, while that in the tire having an aspect ratio of 45% is close to the peak value on the curve $S_2$. Since such a tension strain is caused every repetitive flexing deformation during the running under loading, it is naturally said that the cracking failure at the joint face P, which has not substantially been observed in the tire having an aspect ratio of 65%, is first observed when the tire having an aspect ratio of 45%, particularly in tires having an aspect ratio of not more than 55% are out into practical use. Therefore, such a failure is suitable to be called as a new type of the cracking failure.

The reason why the cracking failure is generated at the joint face P between the sidewall rubbers 67 and 67-1 having the same compounding recipe is due to the fact that the surface states of uncured rubber members corresponding to these sidewall rubbers 67 and 67-1 are somewhat different from the interior states thereof at extrusion and are apt to be changed with the lapse of time ranging from the extrusion to the building and hence the bonding strength at the joint face P after the vulcanization is weak as compared with that of the other portion and finally surface cracking is apt to be generated in such a weak bonding portion under the repetitive action of large tension strain and is gradually grown by the strain concentration after the occurrence of the cracking.

According to the invention, the occurrence of the above new type cracking failure resulting from the large tension strain can effectively be prevented by previously and separately providing an uncured inner sidewall rubber segment and an uncured outer sidewall rubber segment, which segments correspond to an inner portion and an outer portion parted from each sidewall rubber of a tire after vulcanization in a radial direction over a full circumference thereof so as to satisfy that an end of a parting face located on an outer surface of the sidewall rubber is not more than ½ of the section height of the tire; sticking the uncured sidewall rubber segment on a green case at a first building step; and sticking the outer sidewall rubber segment previously united onto both side surfaces of an uncured tread rubber member on the toroidally deformed green case and the uncured inner sidewall rubber segment together with an uncured belt member and an uncured tread rubber member at a second building step, whereby the end of the parting face Q of the sidewall rubber in the tire after the vulcanization (see FIGS. 13 and 14) or a joint face Q after the vulcanization between the inner sidewall rubber segment and the outer sidewall rubber segment can be located on the outer surface of the sidewall rubber at a position corresponding to not more than ½ of the section height SH. That is, the end of the parting face Q corresponds to a region near to a strain of 0% or a strain region near to compression side on the strain distribution curves of FIGS. 13 and 14.

In the building method of the green tire according to the invention, a new step to be added is not required as compared with the conventional building method of the third type, so that productivity can be maintained at a higher level through the first and second building steps. Furthermore, there is no change on the construction of the tire, so that it is possible to maintain the performances inclusive of wear resistance and the like in the tread rubber and the durability of the tire at given level.

When the annular projecting rib is provided on the outer surface of the sidewall rubber of the tire at a position corresponding to not more than ½ of the section height SH, if the end of the parting face is located in the vicinity of an outer side edge of the projecting rib in the radial direction of the tire, the new type cracking failure can effectively be prevented.

Moreover, a composite rubber member obtained by extruding a pair of the uncured outer sidewall rubber segments and the uncured tread rubber member in form of a one-piece body through an extruder having a plurality of extruding heads is applied to the second building step, or an uncured combination member obtained by previously sticking the uncured belt member and the uncured tread rubber member on a forming drum and sticking a pair of the uncured outer sidewall rubber segments on the uncured tread rubber member is applied to the second building step, whereby the increase of the building steps can be avoided.

An embodiment of the invention will be described in detail with reference to FIGS. 1–4.

Figure 1:
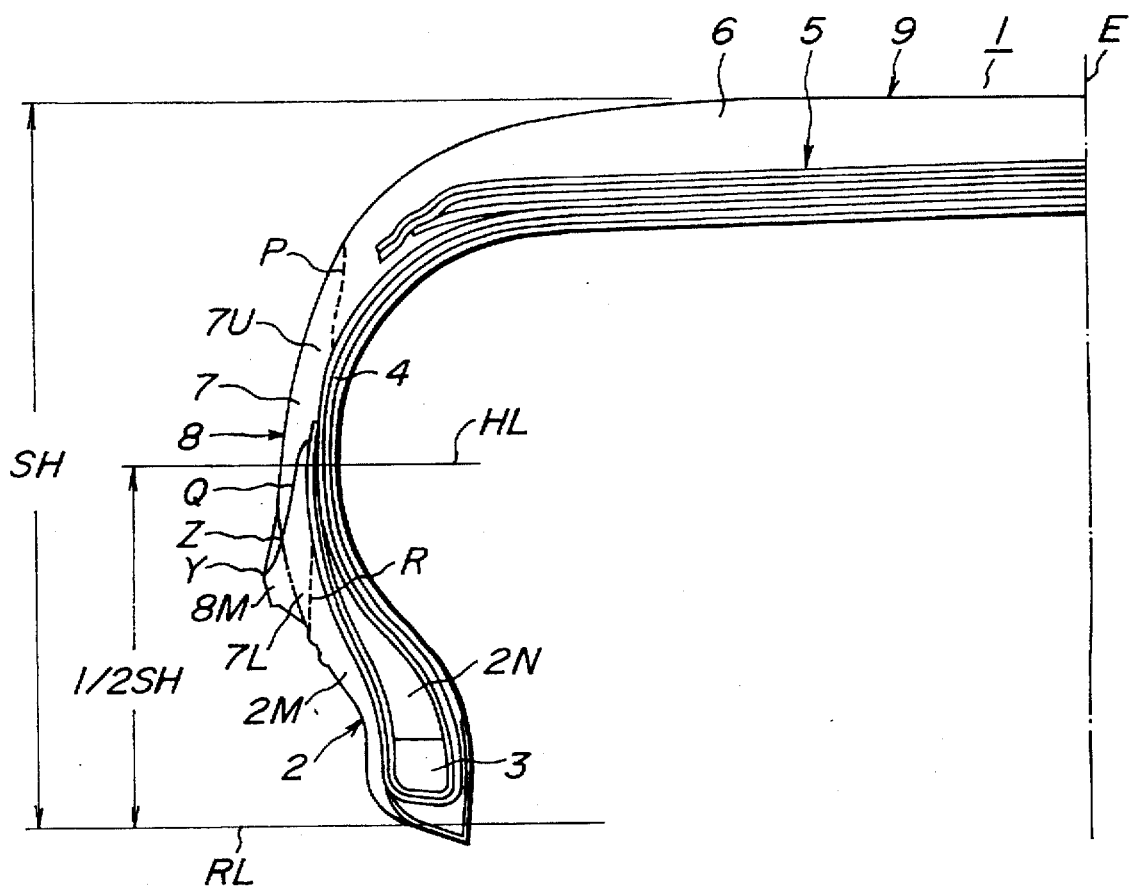
FIG. 1 is a diagrammatically left-half sectional view illustrating a parting face of a sidewall rubber in a tire built by the building method according to the invention.

In FIG. 1 is shown a left-half section of a low-section profile pneumatic radial tire 1 having an aspect ratio of not more than 55% with an equatorial plane E thereof. Moreover, circumferential grooves formed in the tread portion are omitted.

The basic construction of the tire 1 is the same as in the aforementioned tires 20, 40 and 60, in which a radial carcass 4 of two rubberized plies toroidally extending between a pair of bead cores 3 is wound around each bead core 3 from inside of the tire toward outside thereof to reinforce a bead portion 2, a sidewall portion 8 and a tread portion 9 and a belt 5 is comprised of two inner belt layers containing steel cords therein, the cords of which layers being crossed with each other, and two outer belt layers containing cords arranged in parallel to the circumferential direction of the tire for reinforcing the tread portion 9.

A sidewall rubber 7 extends from each side of the tread rubber 6 through a joint face P up to an upper region of the bead portion 2. In the illustrated embodiment, the bead portion is reinforced by disposing a rubber chafer 2M engaging a flange of an applicable rim along an outer surface of the turnup of the carcass 4 and disposing a rubber stiffener 2N taperedly extending between the carcass 4 and its turnup on the outer periphery of the bead core 3. Therefore, the sidewall rubber 7 in the illustrated embodiment forms a joint face R with the rubber chafer 2M inward in the radial direction. Moreover, the inner surface of the carcass 4 is lined with an air-impermeable innerliner.

In the illustrated embodiment, an annular projecting rim 8M is provided on the sidewall portion 8. A tire having no projecting rib 8M is shown by a phantom line. The projecting rib 8M is called a rim guard and serves to protect the sidewall portion 8 from remarkable damaging through the rim flange when the tire is subjected to a large flexing deformation. Therefore, the projecting rib 8M is located at a lower part of the sidewall portion 8, more exactly at a position corresponding to not more than ½ of the section height SH. The section height SH of the tire means a height measured from a rim diameter line RL.

The sidewall rubber 7 is parted into an inner portion 7L and an outer portion 7U in the radial direction of the tire by a line segment or parting face Q over a full circumference of the sidewall rubber as shown in FIG. 1. Preferably, the parting face Q is inclined with respect to a bisecting line HL of the tire section height. In this case, an upper part of the inner portion 7L is overlapped with a lower part of the outer portion 7U in the radial direction of the tire, in which the outer portion 7U is desirably located outside the overlapping position.

In the invention, it is important to locate an end Y (or Z) of the parting face Q revealing on the outer surface of the sidewall rubber 7 at a position corresponding to not more than the bisecting line HL showing a half of the tire section height SH. The former end Y is existent in the sidewall rubber 7 provided with the projecting rib 8M, while the latter end Z is existent in the sidewall portion 8 having no projecting rib 8M as shown by the phantom line. In the former case, the top surface of the projecting rib 8M is located at a height corresponding to not more than the bisecting line HL and the end Y is located in the vicinity of the outer side edge of the top surface of the projecting rib 8M in the radial direction of the tire.

Figure 2:
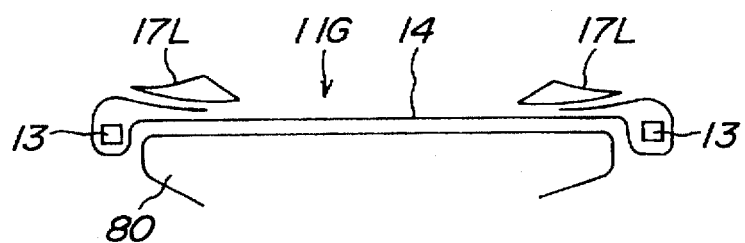
FIG. 2 is a schematic view illustrating a section of a green case at a first building step in the building method according to the invention.
Figure 3:
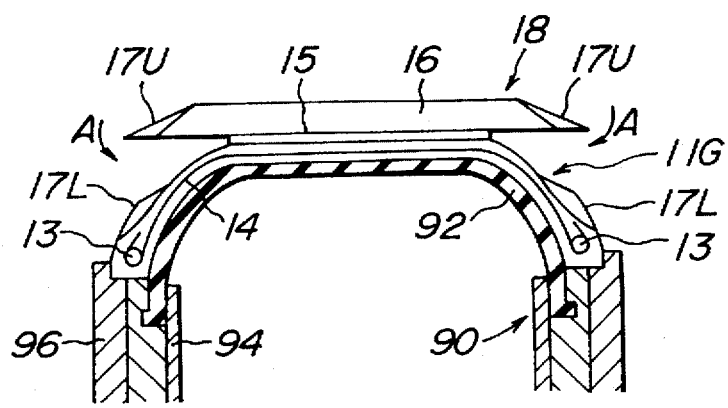
FIG. 3 is a schematic view illustrating a section of a green tire at the first half of a second building step in the building method according to the invention.
Figure 4:
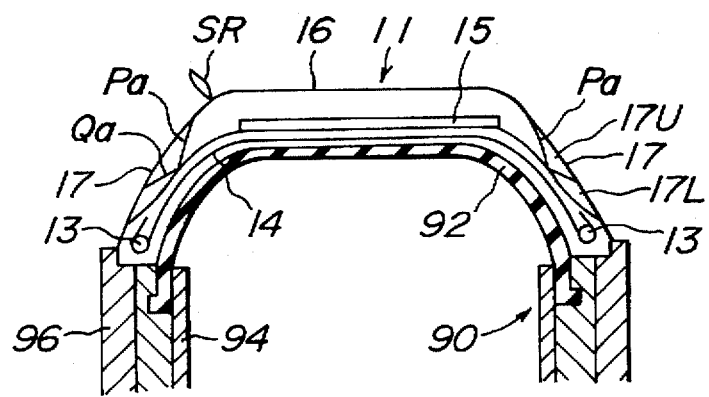
FIG. 4 is a schematic view illustrating a section of a green tire at the last half of a second building step in the building method according to the invention.

The method of building the green tire for the above tire 1 will be described with reference to FIGS. 2–6. In FIG. 2 is schematically and sectionally illustrated a green case 11G completed at the first building step and a part of a forming machine 80 used in the first building step. In FIG. 3 is schematically and sectionally illustrated a green tire at the first half of the second building step and a portion of a forming machine used in the second building step, while FIG. 4 schematically illustrates the green tire completed at the last half of the second building step likewise the case of FIG. 3. FIGS. 5 and 6 show a combination member previously assembled from an uncured belt member 15 and an uncured tread rubber member 16 for use in the second building step, respectively.

As shown in FIG. 2, the uncured ply member 14 for the radial carcass and a pair of the uncured bead core members 13 are first assembled at the first building step, and a pair of the uncured inner sidewall rubber segments 17L among the separately provided inner and outer sidewall rubber segments are stuck thereon at given positions to form a cylindrical green case 11G. On the other hand, the outer sidewall rubber segments 17U are previously united onto both side surfaces of the uncured tread rubber member 16 to form a composite rubber member for the supply to subsequent second building step. In this case, the uncured members (not shown) for the rubber chafer 2M, rubber stiffener 2N and the innerliner are also assembled in the green case. Moreover, it is desirable that the uncured inner sidewall rubber segment 17L and the uncured member for the rubber chafer 2M are previously shaped into a composite rubber member by simultaneously extruding them through a dual tuber or the like.

The green case 11G is fed from the first building step to the second building step. As shown in FIGS. 3 and 4, a forming machine 90 for the second building step comprises a cylindrical bladder 92 freely expanding into a toroidal shape, a pair of supporters 94 airtightly supporting the bladder, and a pair of bead portion bearing bodies 96 fixed to the supporters for surely bearing a pair of the bead portions in the green case 11G and freely approaching the born bead portions to each other to narrow the distance between the bead portions to a given level (the same as used in the conventional first to third type building methods). Furthermore, the forming machine 90 is provided with means for supplying a pressurized fluid (e.g. pressurized air) having a given pressure to the bladder 92 to inflate (expand) the bladder and discharging it from the inside of the bladder 92 to turn the bladder into the original cylindrical shape.

As shown in FIG. 3, the green case 11G fed to the second building step is toroidally expanded and deformed by narrowing the distance between the mutual bead core members 13 embedded in the bead portions in accordance with the approaching of the bead portion bearing bodies 96 and the expanding deformation of the bladder 92. Onto the outer periphery of the green case 11G expanded to a given outer diameter are applied the uncured belt member 15, the uncured tread rubber member 16 and the uncured outer sidewall rubber segments 17U previously united onto both sides of the member 16.

In this connection, three uncured members 15, 16 and 17U are previously united to form a combination member 18 as shown in FIGS. 5 and 6. In the embodiment of FIG. 5, the uncured tread rubber member 16 and a pair of the uncured outer sidewall rubber segments 17U are simultaneously extruded through an extruder having a plurality of extruding heads, or so-called dual or triple tuber to form a composite rubber member, which is fed and stuck onto the uncured belt member 15 existing on a forming drum 85 (hereinafter abbreviated as BT drum) to form the combination member 18 on the BT drum.

In the embodiment of FIG. 6, the uncured belt member 15 and the uncured tread rubber member 16 are previously stuck to form a combination member on the BT drum 85 and then a pair of the uncured outer sidewall rubber segments 17U are stuck thereonto at a position 16s shown by dotted lines to form the combination member 18. This embodiment is advantageous when the uncured tread rubber member 16 itself is a composite rubber member comprised of different rubber compositions. Moreover, the sticking of the uncured outer sidewall rubber segment may be carried out after the combination member comprised of the uncured belt member and the uncured tread rubber member is stuck on the outer periphery of the toroidally deformed green case to form a green tire having no uncured outer sidewall rubber segment at the second building step. In the latter case, the sectional contour of the uncured outer sidewall rubber segment must be matched with a space defined by the side surface of the uncured tread rubber member and the outer surface of the uncured inner sidewall rubber segment. In any case, the resulting combination member 18 is applied to the green case 11G shown in FIG. 3 at the second building step. Moreover, means for exactly positioning the combination member 18 on the green case 11G is omitted.

As shown in FIG. 4, the combination member 18 placed at a state of FIG. 3 is stuck on the green case 11G by pushing a stitching roll SR onto the combination member 18 in a direction perpendicular to the combination member as far as possible to gradually fold each side portion of the combination member 18 inward in the radial direction. Thus, the uncured inner and outer sidewall rubber segments 17L and 17U are stuck to each other at a sticking face Qa (shown by a line) to form a unified sidewall rubber member 17. Moreover, a line Pa is a sticking face between the side end of the uncured tread rubber member 16 and the uncured outer sidewall rubber segment 17U.

Then, the green tire 11 formed by the above building method is taken out from the forming machine 90 by discharging the pressurized fluid from the inside of the bladder 92 and transferred to subsequent vulcanization step, at where the green tire 11 is subjected to a vulcanization building to manufacture a product of the low-section profile pneumatic radial tire 1.

In order to evaluate the effect of the invention, there are five radial test tires for passenger cars having a tire size of 285/30ZR18. The first and second test tires are tires in Examples 1 and 2 according to the invention and have the construction shown in FIG. 1. The first tire (Example 1) has a sidewall portion 8 shown by a phantom line in FIG. 1, while the second tire (Example 2) has a sidewall portion 8 provided with an annular projecting rib 8M. In these tires, a height of an end Z of a parting face Q as measured from a rim diameter line RL is set to 0.4 SH, while a height of an end Y is set to 0.36 SH. The latter end Y substantially corresponds to an outer end of the top surface of the projecting rib 8M in the radial direction of the tire. The constructional uncured members are provided to satisfy the above set value and assembled through the first and second building steps to form a green tire 11, which is vulcanized to obtain a desired test tire having the parting face Q substantially corresponding to the set value. Moreover, a composite rubber member comprised of the uncured outer sidewall rubber segment 17U and the uncured tread rubber member 16 is formed by extrusion and shaped into a combination member 18 according to the building shown in FIG. 5.

The remaining three test tires are manufactured by the conventional first to third type building methods as Conventional Examples 1–3, respectively. The structure of the tire in Conventional Examples 1–3 is the same as in Example 1 except for the joint face of the sidewall rubber.

The productivity at the first and second building steps is evaluated with respect to these test tires to obtain results as shown in Table 1. The productivity is represented by an index value on the basis that Conventional Example 1 is 100. The smaller the index value, the better the productivity.

The resistance to cracking in the sidewall rubber is evaluated by running each of the test tires on a drum under CBU test conditions over a given distance and measuring a crack length produced on the surface of the sidewall rubber. The test results are also shown in Table 1. The resistance to cracking is represented by an index value on the basis that Conventional Example 1 is 100. The smaller the index value, the better the resistance to cracking.

TABLE 1

|  | Conventional Example | | | Example | |
|---|---|---|---|---|---|
|  | 1 | 2 | 3 | 1 | 2 |
| Resistance to cracking (index) | 100 | 20 | 70 | 20 | 15 |
| Productivity (index) | 100 | 107 | 100 | 100 | 100 |

As seen from Table 1, the tire of Conventional Example 2 is certainly excellent in the resistance to cracking or the sidewall durability, but is considerably poor in the productivity and lacking in the practical use. On the other hand, the tire of Conventional Example 3 is excellent in the productivity, but is poor in the resistance to cracking due to premature occurrence of the new type cracking failure, which considerably comes into problem in the practical use. On the contrary, the tires of Examples 1 and 2 maintain the productivity at a considerably higher level and prevent the occurrence of the new type cracking failure to develop an excellent resistance to cracking.

As mentioned above, according to the invention, the parting face between the uncured inner and outer sidewall rubber segments is located in a region of minimum tension strain during the running of the tire under loading by applying such a building method that the uncured inner and outer sidewall rubber segments are separately provided to locate the outer end of the parting face in the sidewall rubber at a position corresponding to not more than ½ of the section height in the tire after the vulcanization and the uncured inner sidewall rubber segment is stuck at the first building step and the uncured outer sidewall rubber segment is stuck at the second building step, whereby the new type cracking failure inevitably created in the conventional low-section profile pneumatic radial tire can advantageously be prevented. Furthermore, the invention can provide the method of building the green tire for the low-section profile pneumatic radial tire capable of maintaining the productivity at a considerably high level without damaging the other tire performances and durability.

What is claimed is:

1. A method of building a green tire for a low-section profile pneumatic radial passenger car tire having a radial carcass of at least one rubberized ply toroidally extending between bead cores embedded in a pair of bead portions, a belt superimposed about a crown portion of the carcass, a tread rubber arranged on the belt, a pair of sidewall rubbers each extending from each side end of the tread rubber to an upper position of each of the bead portions and having an aspect ratio of not more than 55%, said sidewall rubber made from a different rubber material than said tread rubber, which method comprises:

separately providing an uncured inner sidewall rubber segment and an uncured outer sidewall rubber segment, which segments correspond respectively to an inner portion and an outer portion of each sidewall rubber of the tire after vulcanization in a radial direction thereof to satisfy a condition where an end of a parting face between said inner and outer segments located on an outer surface of the sidewall rubber is not more than ½ of a section height of the tire;

sticking the uncured inner sidewall rubber segment on a cylindrical green case having already assembled thereon an uncured carcass ply member, a rubber chafer and an uncured bead core member at a first building step;

toroidally expanding and deforming the green case by narrowing a distance between the uncured bead core members; and sticking an uncured belt member and an uncured tread rubber member on an outer periphery of the toroidally deformed green case at a second building step, in which the uncured outer sidewall rubber segment which is integrally united to each side face of the uncured tread rubber member is then stuck on the uncured inner sidewall rubber segment of the green case to form a unified sidewall rubber member.

2. The method according to claim 1, wherein the end of the parting face is located in the vicinity of an outer end in radial direction of an annular projecting rib provided on an outer surface of a sidewall rubber of a vulcanized tire at a position of a height corresponding to not more than ½ of the section height of the tire.

3. The method according to claim 1 or 2, wherein a pair of the uncured outer sidewall rubber segments are extruded together with the uncured tread rubber member through an extruder having a plurality of extruding heads to form a composite rubber member to be applied in the second building step.

4. The method according to claim 1 or 2, wherein the uncured belt member and the uncured tread rubber member are stuck on a forming drum having a given outer diameter and a pair of uncured outer sidewall rubber segments are stuck on both side surfaces of the uncured tread rubber member to form a combination member, which are applied in the second building step.

* * * * *